(12) United States Patent
Tomasko

(10) Patent No.: US 10,230,200 B1
(45) Date of Patent: Mar. 12, 2019

(54) CORD RETRACTOR

(71) Applicant: Laura Tomasko, Coral Springs, FL (US)

(72) Inventor: Laura Tomasko, Coral Springs, FL (US)

( * ) Notice: Subject to any disclaimer, the term of this patent is extended or adjusted under 35 U.S.C. 154(b) by 0 days.

(21) Appl. No.: 15/423,974

(22) Filed: Feb. 3, 2017

Related U.S. Application Data

(60) Provisional application No. 62/291,285, filed on Feb. 4, 2016.

(51) Int. Cl.
| | |
|---|---|
| *H01R 13/72* | (2006.01) |
| *H02G 11/02* | (2006.01) |
| *B65H 75/44* | (2006.01) |
| *B65H 75/48* | (2006.01) |
| *H01R 24/20* | (2011.01) |
| *H01R 24/28* | (2011.01) |
| *H01R 103/00* | (2006.01) |

(52) U.S. Cl.
CPC ......... *H01R 13/72* (2013.01); *B65H 75/4402* (2013.01); *B65H 75/446* (2013.01); *B65H 75/4421* (2013.01); *B65H 75/4434* (2013.01); *B65H 75/4471* (2013.01); *B65H 75/486* (2013.01); *H01R 24/20* (2013.01); *H01R 24/28* (2013.01); *H02G 11/02* (2013.01); *B65H 2701/34* (2013.01); *H01R 2103/00* (2013.01)

(58) Field of Classification Search
CPC ..................................................... H02G 11/02
See application file for complete search history.

(56) References Cited

U.S. PATENT DOCUMENTS

| | | | |
|---|---|---|---|
| 3,705,962 A | 12/1972 | Banister | |
| 3,773,987 A | 11/1973 | Davis et al. | |
| 5,124,532 A | 6/1992 | Hafey et al. | |
| 5,367,243 A * | 11/1994 | Wells | H01M 2/305 320/105 |
| 5,547,393 A | 8/1996 | Jansen | |
| 5,762,281 A | 6/1998 | Foley | |
| 6,170,775 B1 | 1/2001 | Kovacik et al. | |
| 6,253,893 B1 * | 7/2001 | Chi-Min | H01R 12/592 174/113 R |
| 6,273,354 B1 | 8/2001 | Kovacik et al. | |
| 6,293,485 B1 * | 9/2001 | Hollowed | B65H 75/4434 191/12.2 R |
| 6,575,781 B2 * | 6/2003 | Wen-Hsuan | H01R 13/72 191/12.4 |
| 6,957,978 B2 | 10/2005 | Zoller | |
| 7,309,834 B1 * | 12/2007 | Byrd | B65H 75/425 174/135 |
| 7,320,445 B2 * | 1/2008 | Eastwood | B65H 49/322 242/588.6 |

(Continued)

*Primary Examiner* — Tho D Ta

(57) ABSTRACT

A cord retractor for selectively retracting or extending an electrical cord includes a casing having a casing body and a casing lid carried by the casing body. The casing lid is selectively deployable between closed and open positions. A first cord aperture and a second cord aperture are formed in the casing. A rotatable drum is arranged inside the casing. A coil spring engages the drum for rotation. An electrical cord can be wound on the cord drum and selectively extended from the casing through the second cord aperture as the coil spring resists rotation of the cord drum and tends to retract the cord into the casing.

19 Claims, 14 Drawing Sheets

(56) References Cited

U.S. PATENT DOCUMENTS

| | | | | |
|---|---|---|---|---|
| 7,527,132 B2 * | 5/2009 | Choi | ................ | B65H 75/4434 |
| | | | | 191/12.2 R |
| 7,959,444 B2 * | 6/2011 | Corless | ................ | H01R 13/72 |
| | | | | 439/35 |
| 8,137,129 B2 * | 3/2012 | Woods | ............... | B60R 16/0215 |
| | | | | 439/501 |
| 8,336,688 B2 * | 12/2012 | Chen | ................ | B65H 75/4434 |
| | | | | 191/12.2 A |
| 8,380,352 B2 | 1/2013 | Moore | | |
| 2005/0098405 A1 * | 5/2005 | Chang | ................ | H02G 11/02 |
| | | | | 191/12.2 R |

* cited by examiner

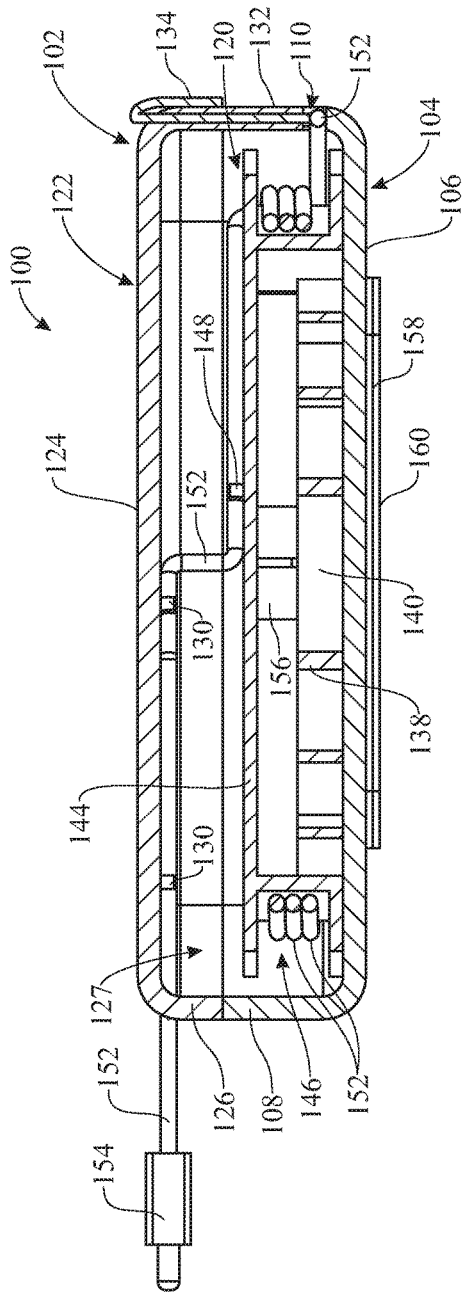
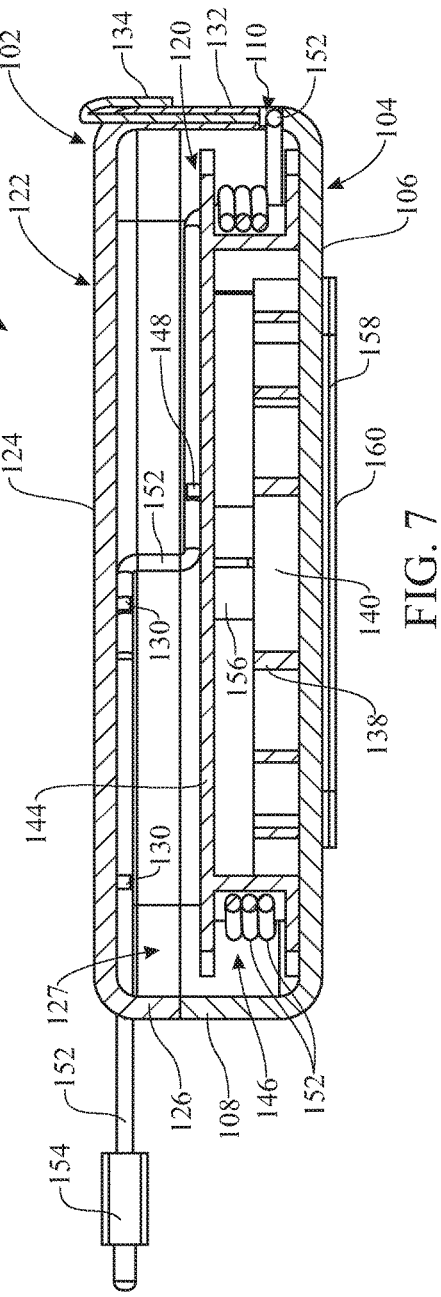
FIG. 6
FIG. 7

CORD RETRACTOR

CROSS-REFERENCE TO RELATED APPLICATIONS

This application claims the benefit of U.S. Provisional Patent Application Ser. No. 62/291,285, filed on Feb. 4, 2016, which is incorporated by reference herein in its entirety.

FIELD OF THE INVENTION

The present invention relates generally to electrical cords, and more particularly, to a cord retractor that is compact, easily portable and configured to selectively retract or extend an electrical cord for any of a variety of electrical appliances.

BACKGROUND OF THE INVENTION

Portable electrical appliances including tools such as drills and saws are designed to be easily carried and transported. Such appliances may have an elongated electrical cord terminating in a cord plug which is inserted in an electrical outlet to provide a supply of electrical power to the appliance. Quite often, the cord has a tendency to become tangled and/or interfere with movement of the appliance. In addition, the cord constrains use of the appliance within a small area defined by the length of the cord.

In another example, appliances such as blow dryers, curling irons and the like are commonly used in barber shops and beauty salons. Typically, these appliances are electrically connected to the electrical outlet through an elongated electrical cord. When not in use, these appliances are usually stored in an accessible location. However, the slackened cord may potentially pose a hazard to workers or customers walking in the salon.

Some electrical appliances may include a cord retractor having a reel on which the electrical cord is wound. A selected length of the cord can be extended from the reel depending on the desired distance away from the electrical outlet which the appliance is to be used. The cord can be wound on the reel to eliminate slack in the cord between the appliance and the electrical outlet. Thus, the cord retractor may eliminate or reduce the tendency of persons who walk in the vicinity of the cord to trip over the cord. It may also reduce the space required for storing the cord when not in use.

A common limitation of conventional cord retractors is that the retractor is built into the electrical cord which supplies power to a single appliance. Therefore, the cord retractor may not be adaptable or applicable to electrical cords which power multiple devices. Moreover, conventional cord retractors may be bulky and complex in design and cumbersome in operation. In addition, they may be uncovered and expose the cord to external agents when stored, increasing the risk of the cord becoming deteriorated. Furthermore, transporting the cord retractor and cord may cause the cord to unwind from or slip off the reel, posing a risk to the user, who may trip on the cord and fall.

Accordingly, there is an established need for a cord retractor which is configured to selectively retract or extend an electrical cord for any of a variety of electrical appliances, and solves at least one of the aforementioned problems.

SUMMARY OF THE INVENTION

The present invention is directed to a cord retractor which is compact and easy to use and transport. The cord retractor has a casing and a drum which is loaded with a coil spring inside the casing. An electrical cord (such as of an electrically-powered appliance) can be wound on the drum and extended from the casing. A cord plug on the electrical cord can be plugged into an electrical outlet to supply electrical power to external electrical equipment. Alternatively, the cord retractor may include a powered, electrical socket for the plugging of the electrical cord. When releasing the cord, the loaded coil spring automatically rotates the drum and causes the cord to retract and wind onto the drum. Thus, depending on the distance between the electrical appliance and the electrical outlet, the length of the electrical cord can be varied as the drum is rotated and winds the electrical cord. In some applications, the casing can be adhesively attached to a surface at a selected location such as adjacent to the electrical outlet.

In a first implementation of the invention, a cord retractor for selectively retracting or extending an electrical cord includes a casing having an internal space, and a rotatable drum arranged within the internal space of the casing. The drum is rotatable relative to the casing in a first direction and an opposite, second direction. The cord retractor further includes a coil spring arranged within the internal space of the casing. The coil spring engages the drum and biases the drum to rotate relative to the casing in the first direction and not in the second direction.

In a second aspect, the casing can further include an opening configured for the passing therethrough of a cord from outside the casing to the internal space. In some embodiments, the cord retractor can further include a cord stopper movably arranged at the opening to selectively block or prevent sliding of a cord through the opening.

In another aspect, the casing can further include an adhesive surface covered by a peel-off layer. Alternatively or additionally, the casing can include at least one outwardly protruding flange having at least one opening configured for the passing therethrough of a fastener.

In yet another aspect, the drum can be reversibly movable within the casing from a first position in which the drum engages a locking protrusion of the casing, thereby preventing the drum from rotating, to a second position in which the drum does not engage the locking protrusion, thereby allowing the drum to rotate. For instance, the drum can be rotatable about a rotation axis, and the drum can be reversibly movable within the casing from the first position to the second position along a transverse direction, wherein the transverse direction is perpendicular to the rotation axis. In some embodiments, the locking protrusion is toothed, and the drum comprises an outer toothed section configured to interlock with the locking protrusion when the drum is in the second position. In some embodiments, the drum is subjected to a spring-biasing toward the first position. In some embodiments, the opening through the casing can be arranged such that pulling of a cord outward through the opening counteracts the spring-biasing and moves the drum towards the second position.

In another aspect, the casing can include a casing body and a casing lid. The lid can be movable between a closed position on the casing body and an open position moved away from the casing body providing access to the internal space. For instance, the casing lid can be hinged to the casing body.

In yet another aspect, the cord retractor can further include an electrical socket arranged at least partially within the casing. An electrically-conductive cable assembly can extend outwardly from the casing and may conduct electrical power towards the casing. A set of one or more electrically-conductive parts can be arranged inside the casing providing electrical communication between the cable assembly and the electrical socket.

In another aspect, the electrical socket can face outwardly from a first side of the casing, and the adhesive surface and peel-off layer can be arranged on a second side of the casing opposite to the first side.

In yet another aspect, the casing lid can include a through opening configured to face the electrical socket when the casing lid is in the closed position.

In another aspect, the cord retractor can further include a hollow support arranged between the cable assembly and the electrical socket. The set of one or more electrically-conductive parts can extend through the support. In turn, the drum is carried by the support and is rotatable relative to the support.

In another aspect, the electrical socket, the support and the drum are movable within the casing in unison, from a first position in which the drum engages a locking protrusion of the casing, thereby preventing rotation of the drum relative to the support, and a second position in which the drum does not engage the locking protrusion, thereby allowing rotation of the drum relative to the support. Preferably, the support is spring-biased toward the first position.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 6 presents a cross-sectional side elevation view of the cord retractor, taken along section plane 6-6 indicated in FIG. 4, showing the cord stopper in the cord-engaging position;

FIG. 7 presents a cross-sectional side elevation view of the cord retractor, taken along section plane 6-6 indicated in FIG. 4, showing the cord stopper in the cord-disengaging position;

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a cord retractor which is configured to selectively retract or extend an electrical cord for any of a variety of electrical appliances. As will be observed from the drawings, the cord retractor is compact and easy to use, and provides for increased protection of the cord when retracted into the cord retractor.

Figure 1:
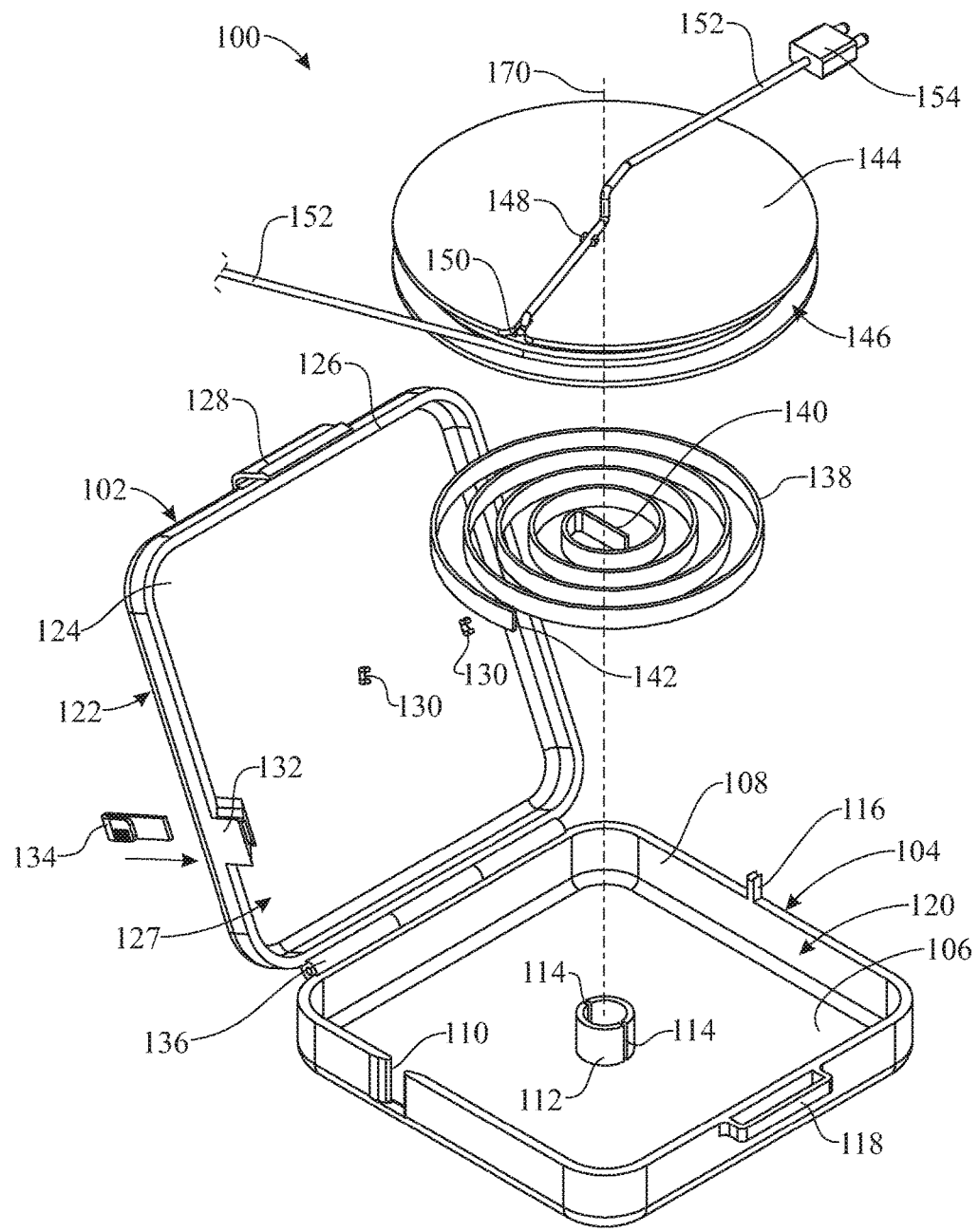
FIG. 1 presents an exploded top front perspective view of an illustrative embodiment of the cord retractor.
Figure 2:
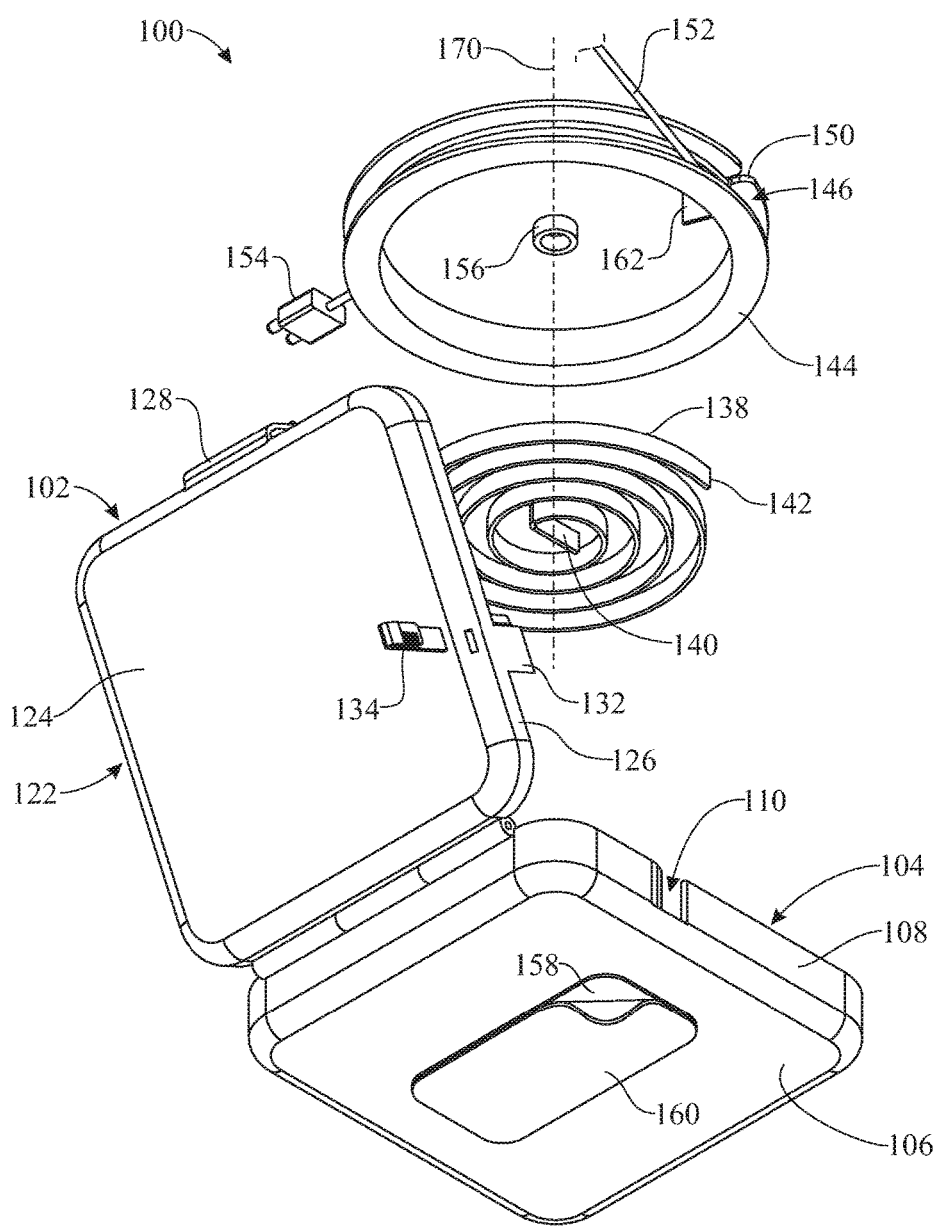
FIG. 2 presents an exploded bottom rear perspective view of the cord retractor.

Referring initially to FIGS. 1 and 2, a cord retractor 100 is illustrated in accordance with an exemplary embodiment of the present invention. The cord retractor 100 includes a casing 102. The casing 102 may include a casing body 104 and a casing lid 122 on the casing body 104. The casing body 104 may include a base panel 106. A base wall or sidewall 108 may extend from the base panel 106; the base sidewall 108 of the present embodiment is a rectangular sidewall with rounded corners. A first cord aperture 110 is provided on the casing 102, and particularly in the base sidewall 108 of the casing body 104 for purposes which will be hereinafter described. The casing body 104 defines an internal space 120, which is delimited by the base panel 106 and base sidewall 108. A drum support or collar 112 may extend upwardly from the base panel 106 into the internal space 120; the drum collar 112 depicted herein is generally cylindrical. A pair of spring slots 114 may be provided in the drum collar 112 for purposes which will be hereinafter described; the spring slots 114 are longitudinally arranged along the drum collar 112, and are in diametrical registration with one another. A cord seat 116 may extend upwardly from the base sidewall 108. In some embodiments, a latch receptacle 118 may extend frontward from the outer surface of the base sidewall 108.

As illustrated in FIGS. 2, 6 and 7, in some embodiments, adhesive 158 may be provided on an external surface of the casing 102. Preferably, the adhesive 158 is provided on a bottom surface of the base panel 106 of the casing body 104, as shown in FIG. 2, in order for the adhesive 158 to be located opposite to the casing lid 122. A peel-off layer 160 may be provided on the adhesive 158 so that the adhesive 158 can remain unexposed and intact when not in use. In typical application of the cord retractor 100, which will be hereinafter described, the peel-off layer 160 may be peeled off the adhesive 158 to facilitate adhesive attachment of the casing 102 to a suitable surface (not illustrated), such as adjacent to an electrical outlet (not illustrated).

Figure 3:
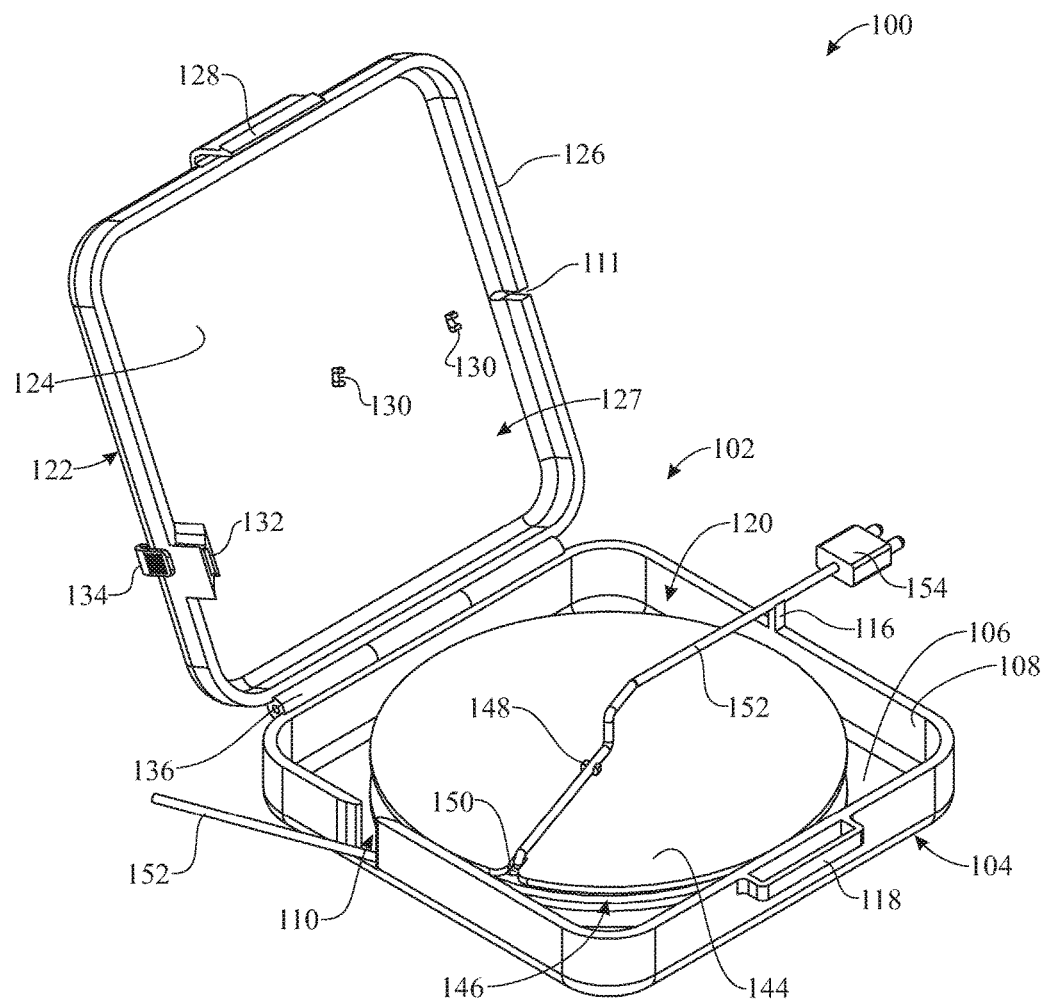
FIG. 3 presents a top front perspective view of the cord retractor with the casing lid of the casing in an open position.

The casing lid 122 of the cord retractor 100 may include a lid panel 124. A lid wall 126 may protrude from the lid panel 124, such as along an entire perimeter of the lid panel 124, as shown in the drawings. The lid wall 126 of the present embodiment is rectangular and has rounded corners. A hinge 136 may pivotally attach the lid wall 126 of the casing lid 122 to the base sidewall 108 of the casing body 104. Accordingly, the casing lid 122 may be selectively disposed in an open position illustrated in FIGS. 1-3 and a closed position illustrated in FIGS. 4, 6, 7 and 9. The casing lid 122 may have an internal space 127, which is delimited by the lid panel 124 and lid wall 126. A latch 128 may protrude from a front area of the lid wall 126. The latch 128 may be configured to detachably engage the latch receptacle 118 and secure the casing lid 122 in the closed position on the casing body 104. When the casing lid 122 is closed on the casing body 104, the cord seat 116 on the casing body 104 may insert into the second cord aperture 111 (FIG. 3) in the lid wall 126 of the casing lid 122. As illustrated in FIGS. 1 and 3, a pair of spaced-apart cord outlet clips 130 may extend from the lid panel 124 into the internal space 127 of the casing lid 122 for purposes that will be hereinafter described. In some embodiments, a stopper mount flange 132 may protrude from the lid wall 126. A cord stopper 134 may be mounted for sliding displacement on the stopper mount flange 132 for purposes that will be hereinafter described.

As shown in FIG. 1, the cord retractor 100 further includes a spring-loaded cord drum 144 mounted for rotation in the internal space 120 of the casing body 104. As illustrated in FIGS. 2, 6 and 7, the cord drum 144 may include a circumferential cord space 146. In application of the cord retractor 100, which will be hereinafter described, the cord space 146 may accommodate an electrical cord 152 in winding of the electrical cord 152 on the cord drum 144. A drum mount nipple 156, best shown in FIG. 2, may extend downward from the cord drum 144. The drum mount nipple 156 is generally cylindrical, and shaped and sized to fit into an upper end of the drum collar 112 of the casing body 104; the fitting is sufficiently loose for the drum mount nipple 156 to rotate within and with respect to the drum collar 112, and yet sufficiently snug to prevent lateral wobbling or oscillating of the cord drum 144 when rotating about a rotation axis 170 defined by the drum collar 112 and drum mount nipple 156. As illustrated in FIGS. 1, 3, 6 and 7, at least one drum-mounted cord clip 148 may be provided on an upper surface of the cord drum 144. A cord notch 150 may be provided in the edge of the cord drum 144 for purposes which will be hereinafter described.

Figure 8:
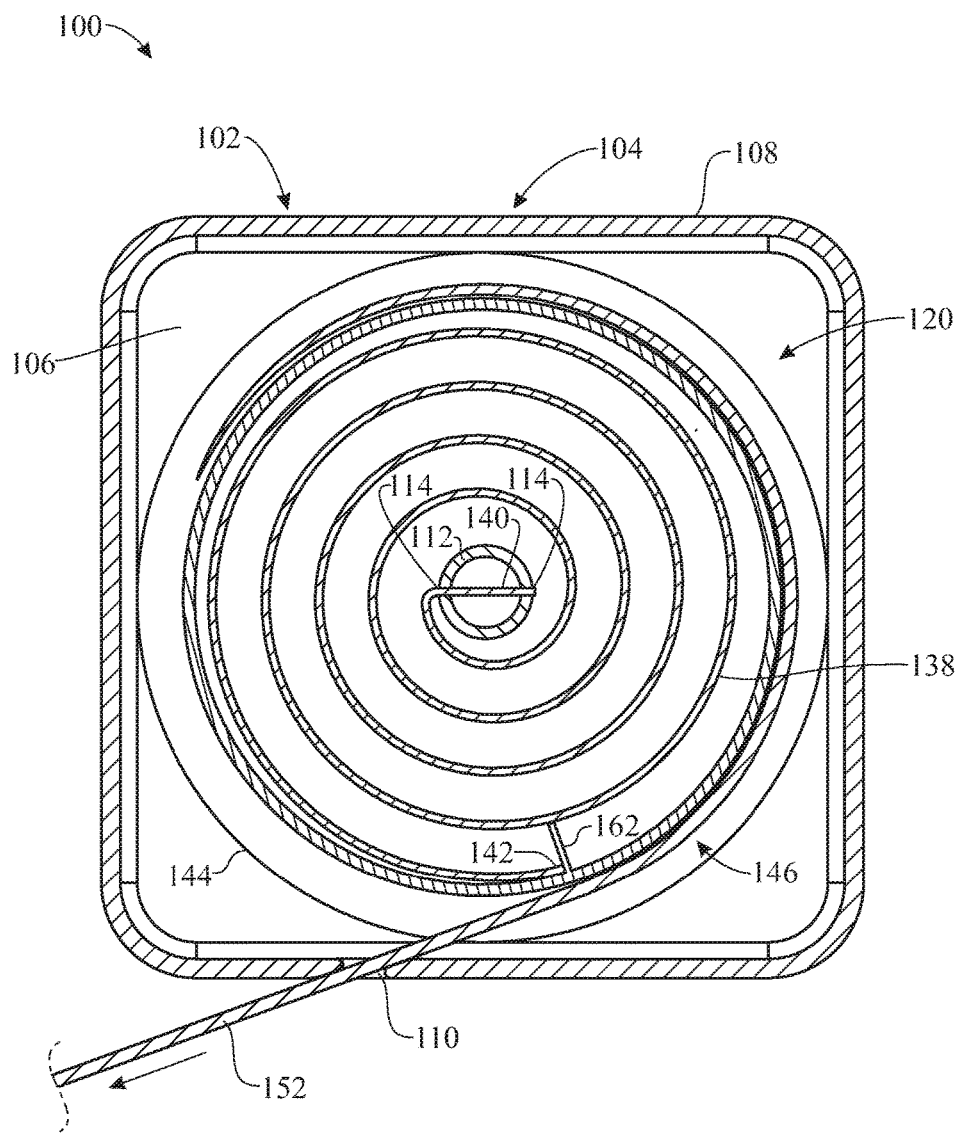
FIG. 8 presents a cross-sectional top pan view of the cord retractor, taken along section plane 8-8 indicated in FIG. 4.
Figure 9:
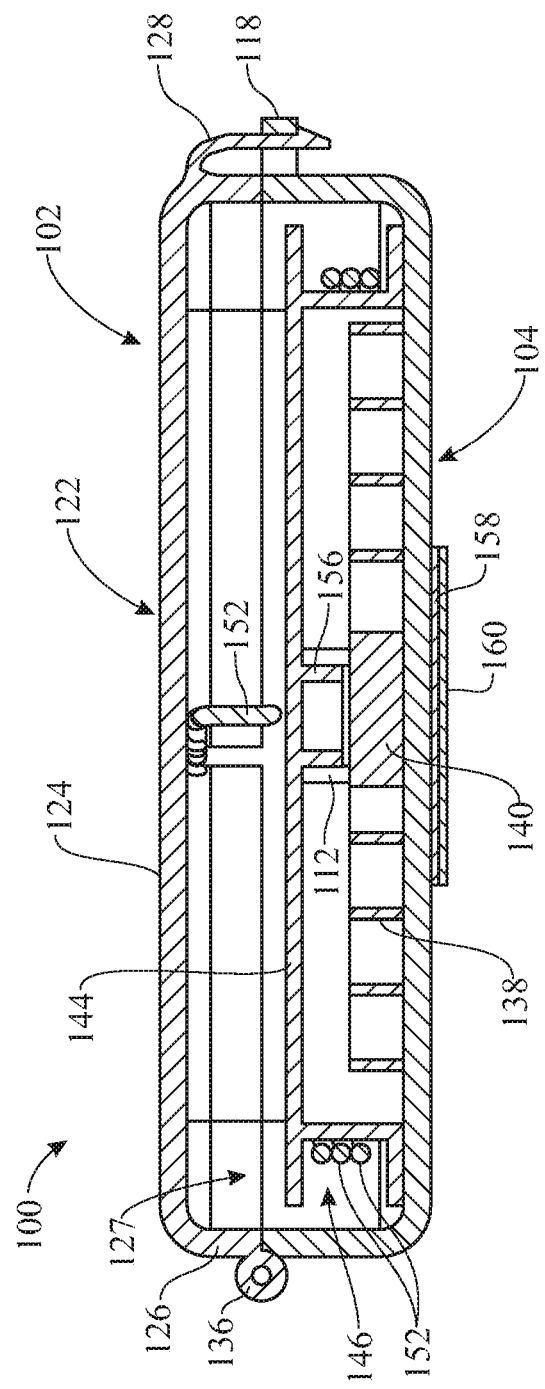
FIG. 9 presents a cross-sectional side elevation view of the cord retractor, taken along section plane 9-9 indicated in FIG. 4.
Figure 10:
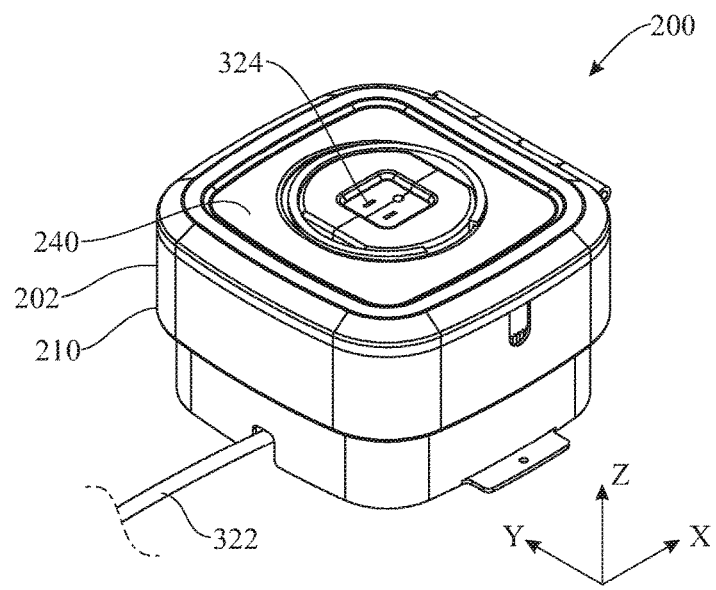
FIG. 10 presents a top front perspective view of a cord retractor in accordance with a second illustrative embodiment of the invention, shown with the lid in a closed position.

A coil spring 138 may engage the cord drum 144 to spring-load the cord drum 144 in the internal space 120 of the casing body 104. The coil spring 138 depicted herein includes an inner, flat end 140 and an outer, pushing end 142. As illustrated in FIG. 8, the flat end 140 of the coil spring 138 is inserted in the registering spring slots 114 of the drum collar 112, and the drum mount nipple 156 is then fitted over the flat end 140 and into the drum collar 112. The pushing end 142 of the coil spring 138 is configured to face and contact a spring flange 162 (FIG. 2) of the cord drum 144. The spring flange 162 extends radially in relation to the rotation axis 170 of the cord drum 144. The coil spring 138 is configured to resist rotation of the cord drum 144 in a first rotational direction and bias the cord drum 144 toward rotation in an opposite, second rotational direction.

Figure 4:
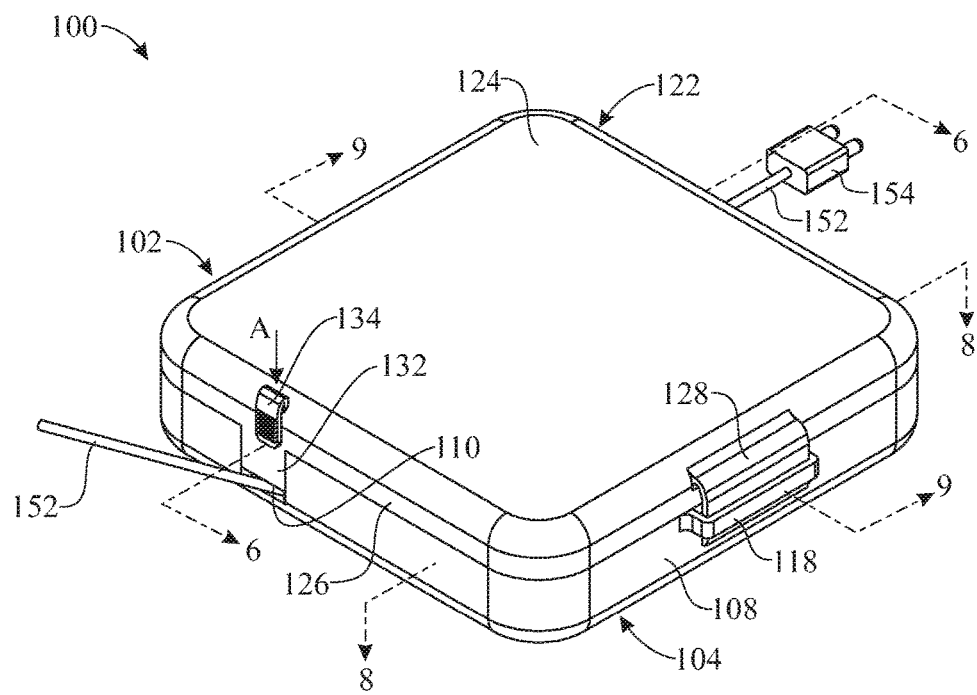
FIG. 4 presents a top front perspective view of the cord retractor with the casing lid in a closed position.
Figure 5:
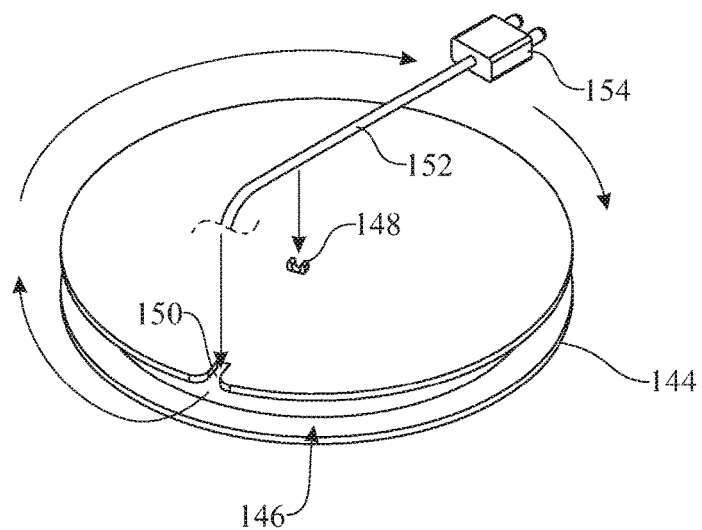
FIG. 5 presents a top front perspective view of the drum with the electrical cord being attached to the drum and wound on the drum.

In typical application of the cord retractor 100, the casing lid 122 is pivoted on the casing body 104 from the closed position illustrated in FIG. 4 to the open position illustrated in FIG. 3. As illustrated in FIG. 5, an electrical cord 152 of an electrical appliance (not illustrated) such as a tool, hairdryer or curling iron, for example and without limitation, or an extension cord, typically terminating in a cord plug 154, may be attached to the drum-mounted cord clip 148 on the cord drum 144 and then inserted through the cord notch 150 in the edge of the cord drum 144. Next, the electrical cord 152 may be wound on the cord drum 144 as the electrical cord 152 extends within the circumferential cord space 146. As illustrated in FIG. 3, the electrical cord 152 and cord drum 144 are fitted into the casing 102. A portion of the electrical cord 152 opposite to the cord plug 154 is placed so that it extends out of the internal space 120 of the casing body 104 through the first cord aperture 110. In turn, the portion of the electrical cord 152 which extends from the drum-mounted cord clip 148 and terminates in the cord plug 154 is placed on the cord seat 116 on the base sidewall 108 of the casing body 104. The casing lid 122 may then be closed on the casing body 104 typically by pivoting the casing lid 122 at the hinge 136 and engaging the latch 128 with the latch receptacle 118 as the cord outlet clips 130 on the interior surface of the lid panel 124 of the casing lid 122 typically receive the electrical cord 152, as illustrated in FIGS. 6 and 7. The second cord aperture 111 in the lid wall 126 of the casing lid 122 receives the cord seat 116 as the electrical cord 152 extends from the internal space 127 of the casing lid 122 through the second cord aperture 111, and the electrical cord 152 is retained within the second cord aperture 111.

As illustrated in FIG. 2, the peel-off layer 160 may be removed from the adhesive 158. The adhesive 158 may be secured to a surface (not illustrated) which is adjacent or within proximity to an electrical outlet or other power source (not illustrated). The cord plug 154 on the end of the electrical cord 152 may be plugged into the power source to supply electrical power to the electrical cord 152 and thus to an appliance or other equipment connected to the electrical cord 152.

The coil spring 138 normally biases the cord drum 144 such that the cord drum 144 tends to wind the electrical cord 152 on the cord drum 144 (counterclockwise if observed from above, in accordance with the present embodiment). If a user pulls on the portion of the electrical cord 152 which protrudes from the first cord aperture 110 with sufficient force, the user may overcome the winding bias which the cord drum 144, imparted by the coil spring 138, exerts against the electrical cord 152, and cause the cord drum 144 to rotate in the unwinding direction (clockwise, in accordance with the present embodiment). A selected length of the electrical cord 152 can be paid out from the cord drum 144 and pulled from the casing 102 through the first cord aperture 110 as the cord drum 144 rotates in the internal space 120 of the casing body 104. As the cord drum 144 rotates in the unwinding direction (clockwise), the spring flange 162 pushes the pushing end 142 of coil spring 138. Since the opposite, flat end 140 of the coil spring 138 is fixed to the casing body 104, the coil spring 138 is partially unwound and thus becomes loaded.

The pushing end 142 of the loaded coil spring 138 tends to push the spring flange 162 of the cord drum 144 in the winding direction (counterclockwise) and cause the cord drum 144 to rotate in said winding direction. Thus, in the absence of an outward pulling of the electrical cord 152, the spring-loaded cord drum 144 tends to wind the electrical cord 152 thereon. The spring-loaded cord drum 144 therefore ensures that the electrical cord 152 remains taut between the appliance and the power source and prevents or minimizes the tendency of the electrical cord 152 to become a hazard to persons walking in the vicinity of the power source or the appliance.

As indicated in FIG. 4 by a vertically downward arrow A, in some applications, the cord stopper 134 can be slid on the stopper mount flange 132 against the electrical cord 152 to retain the electrical cord 152 within the first cord aperture 110 and thus prevent further retraction of the electrical cord 152 into the casing 102 through the first cord aperture 110 and secure the selected length of the electrical cord 152 extending from the cord retractor 100. The illustration of FIG. 7 shows the cord stopper 134 in a top, non-retaining position, whereas FIG. 6 shows the cord stopper 134 in a bottom, retaining position in which the cord stopper 134 is pressing against the electrical cord 152 to prevent winding of the electrical cord 152 onto the cord drum 144.

It will be appreciated by those skilled in the art that the cord retractor 100 is compact and unobtrusive and can be placed in any of a variety of locations within a home or business for the purpose of extending and retracting an electrical cord which supplies electrical power to any of a variety of electrical appliances or other electrically-powered equipment.

In some embodiments, the cord retractor 100 may include an incremental cord drum brake (not illustrated) which is similar to the conventional braking mechanism of a shutter or shade system. Accordingly, the cord drum brake may engage the cord drum 144 in such a manner that the cord drum 144 "clicks" incrementally and prevents the electrical cord 152 from retracting back into the internal space 120 of the casing body 104 in increments. A mechanism (not illustrated) for retracting the electrical cord 152 may be included to bypass the incremental braking of the cord drum 144.

The illustrations of FIGS. 10-17 present a cord retractor 200 in accordance with a second illustrative implementation of the invention. The cord retractor 200 comprises a casing 202 having a casing body 210 and a casing lid 240. Throughout the description of the present embodiment, reference will be made to a front-to-back direction X, a transverse, left-to-right direction Y and a vertical or top-to-bottom direction Z of the cord retractor 200. Similarly to the previous embodiment, the casing body 210 and casing lid 240 are generally rectangular with rounded edges. The casing lid 240 is pivotably attached to the casing body 210 by a hinge 250, allowing the casing lid 240 to pivotally switch between a closed position (shown in FIG. 10) and an open position (shown in FIG. 11). The casing lid 240 can include a lid opening 242 extending through the casing lid 240.

Figure 12:
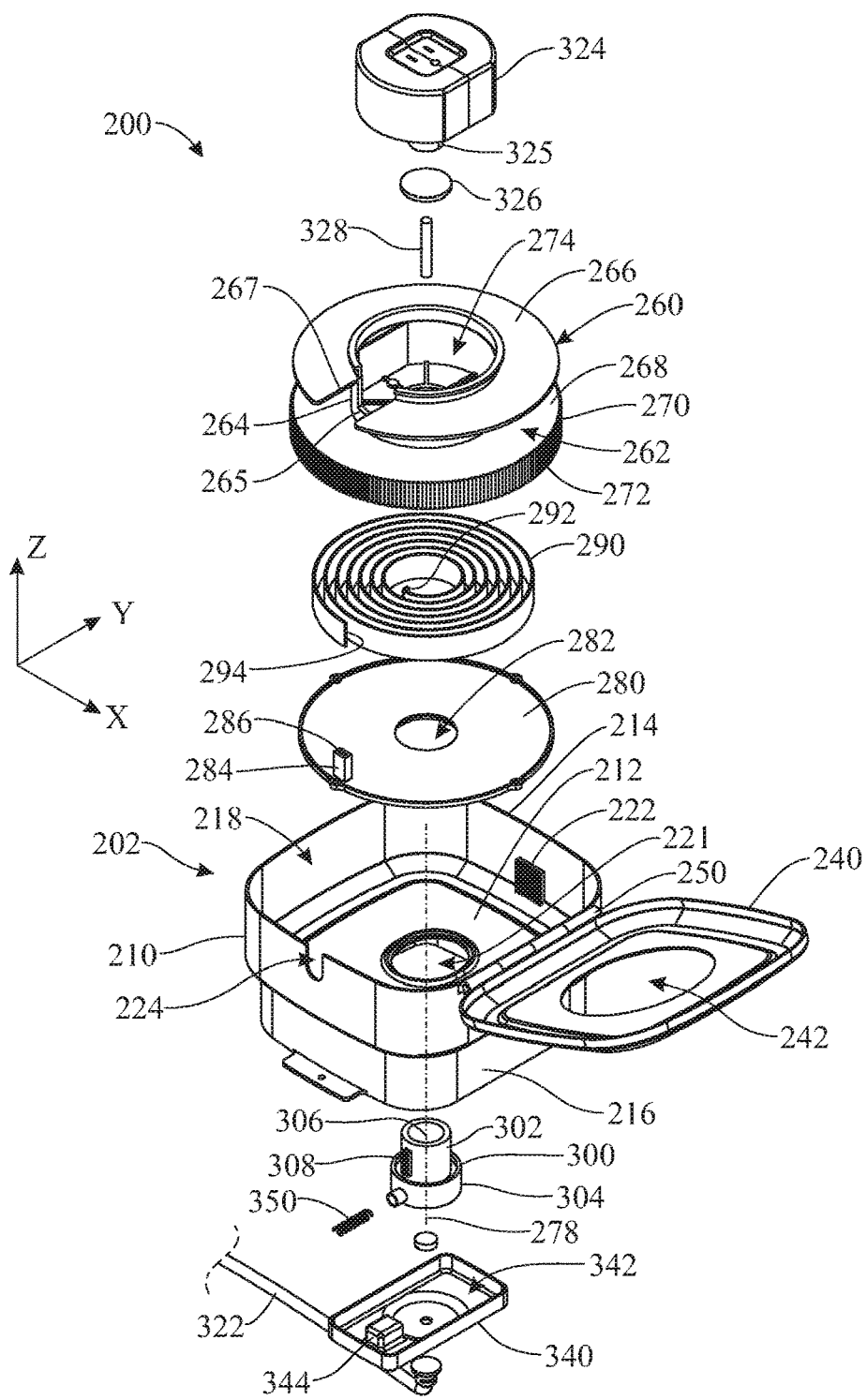
FIG. 12 presents an exploded, top rear perspective view of the cord retractor of FIG. 10.
Figure 13:
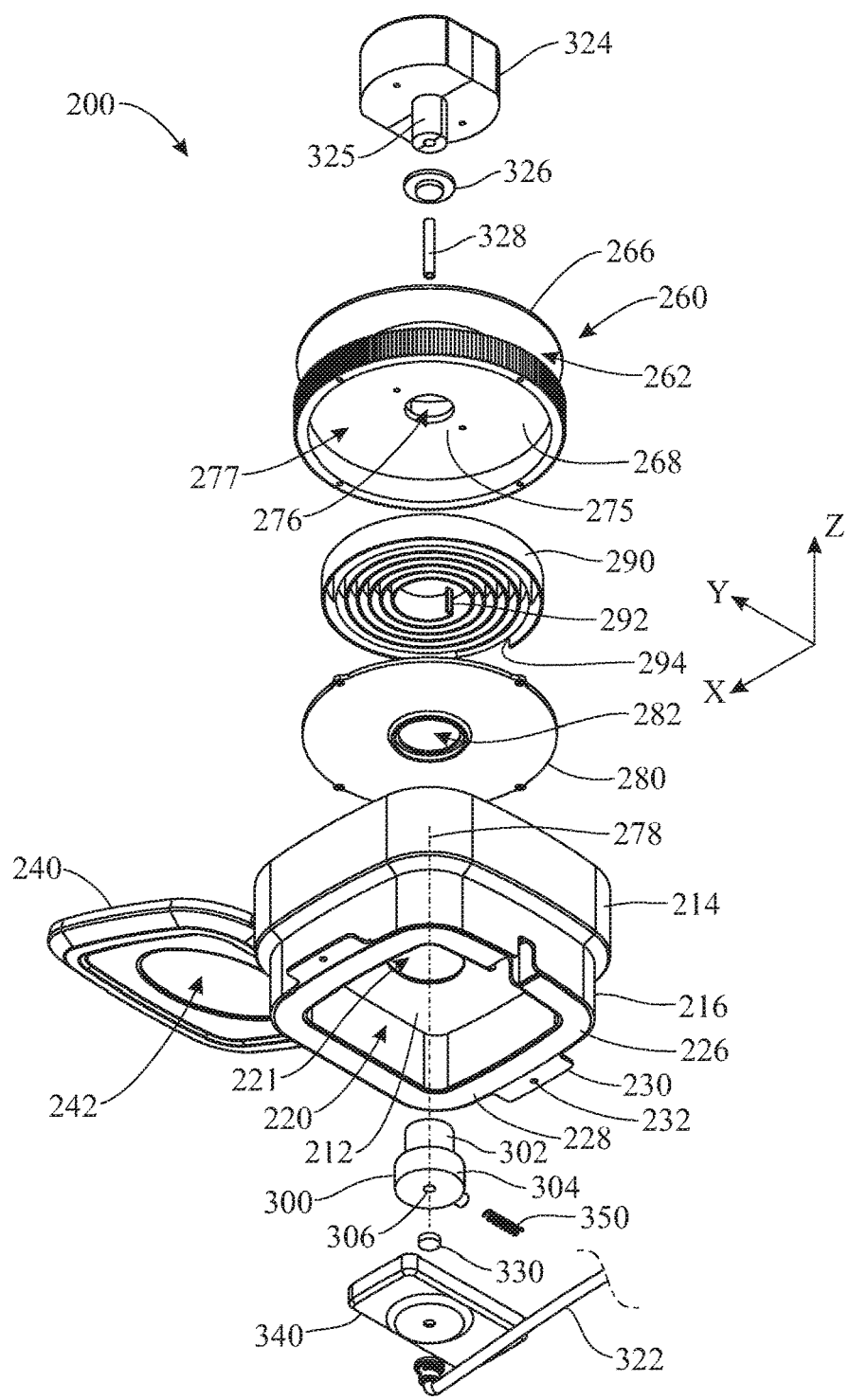
FIG. 13 presents an exploded, bottom front perspective view of the cord retractor of FIG. 10.

As best shown in FIGS. 12 and 13, the casing body 210 comprises a base panel 212, a first sidewall 214 and a second sidewall 216, the first and second sidewalls 214 and 216 being generally rectangular. As shown in FIG. 12, the first sidewall 214 extends upward from the base panel 212 delimiting a first internal space 218 of the casing body 210. In turn, the second sidewall 216 extends downward from the base panel 212 delimiting a second internal space 220 of the casing body 210. A through opening 221 extends through the base panel 212, communicating the first internal space 218 with the second internal space 220. The through opening 221 is slightly elongated in a left-to-right or transverse direction Y of the casing body 210. The hinge 250, in turn, is arranged on a rear side of the first sidewall 214, providing a transverse rotation axis for the casing lid 240. On an inner side of the first sidewall 214, a locking protrusion 222 protrudes from the first sidewall 214 into the first internal space 218; in the present embodiment, the locking protrusion 222 is formed as a toothed or saw-like protrusion comprising several teeth. On another side of the first sidewall 214, opposite to the locking protrusion 222, the first sidewall 214 further includes a side opening 224 extending through the first sidewall 214.

As shown in FIG. 13, the second sidewall 216 of the casing body 210 ends in a bottom side 226. Preferably, the bottom side 226 is flat or substantially flat and provided with an adhesive material covered with a peel-off layer 228; when removing the peel-off layer 228, the adhesive material is exposed allowing the cord retractor 200 to be adhered to a wall or other installation surface. Alternatively or additionally, the casing body 210 can include one or more side flanges 230 provided with one or more openings or holes 232 for the passing therethrough of a threaded fastener, nail or similar fastener, in order to mechanically secure the cord retractor 200 to a wall or similar surface.

Similarly to the previous embodiment, a cord drum 260 is rotatably housed within the casing body 210. The cord drum 260 comprises a circumferential cord space 262 configured to allow the winding of a cord therewithin, as will be described in greater detail hereinafter. The cord drum 260 further comprises a drum collar or central column 264 which, as best shown in FIG. 12, includes a side opening 265 extending therethrough. A top plate 266 and a bottom plate 268 protrude radially outward and spaced apart from one another, thereby delimiting the cord space 262 therebetween. The top plate 266 comprises a radial slit 267. A peripheral, circumferential skirt 270 extends downward from the bottom plate 268. The skirt 270 is provided with outer protuberances or teeth 272 along the circumference of the skirt 270, configured to interlock with the teeth of the locking protrusion 222 of the casing body 210 for purposes that will be described in greater detail hereinafter. The cord drum 260 further comprises a cavity 274 extending vertically through the top plate 266 and central column 264, and ending in a base wall 275 provided with a through opening 276. The cavity 274 communicates with the cord space 262 of the cord drum 260 via the side opening 265 of the central column 264. A bottom cavity 277 is delimited by the bottom plate 268 and the skirt 270, and communicates with the cavity 274 through the opening 276 in the base wall 275. A plate or cover 280 is attached to the skirt 270 to enclose the bottom cavity 274. The cover 280 comprises a through opening 282 which is vertically aligned with the opening 276 of the base wall 275 of the cord drum 260. The cover 280 further comprises a topward protrusion 284 extending from a top side of the cover 280. In some embodiments, as shown, the topward protrusion 284 can include a slot or recess 286 for purposes that will be described hereinafter.

As shown in FIG. 13, the cord retractor 200 further includes a coil spring 290 having an inner end 292 and an outer end 294. Similarly to the previous embodiment, the coil spring 290 is configured to elastically bias the cord drum 260 to rotate in cord-winding direction, and to allow rotation of the cord drum 260 in an opposite, cord-unwinding direction when a cord wound on the cord drum 260 is appropriately pulled outward from the cord retractor 200.

The cord drum 260 of the present embodiment is rotatably carried by a support 300. As shown in FIG. 12, the support 300 can be formed as an elongated part having a narrower cylindrical top section 302 and a wider cylindrical bottom section 304, for instance and without limitation. A through hole 306 can extend longitudinally (vertically, in accordance with the orientation of the cord retractor 200 throughout the drawings) along the support 300. The cord drum 260 is fitted onto the support 300 by inserting the top section 302 of the support 300 through the bottom cavity 277 and into the opening 276 of the base wall 275. The top section 302 rotatably, yet snugly received within the opening 276, allowing the cord drum 260 to rotate in relation to the top section 302 and about a rotation axis 278 defined by the top section 302 of the support 300; it must be noted that the support 300 does not rotate, i.e. remains rotationally fixed relative to the rotation axis 278.

The support 300 further includes a side slot or receiving section 308 for receiving the inner end 292 of the coil spring 290. The outer end 294 of the coil spring 290, in turn, is configured to contact the topward protrusion 284 of the cover 280, and preferably be received within the recess 286 of the topward protrusion 284.

Figure 16:
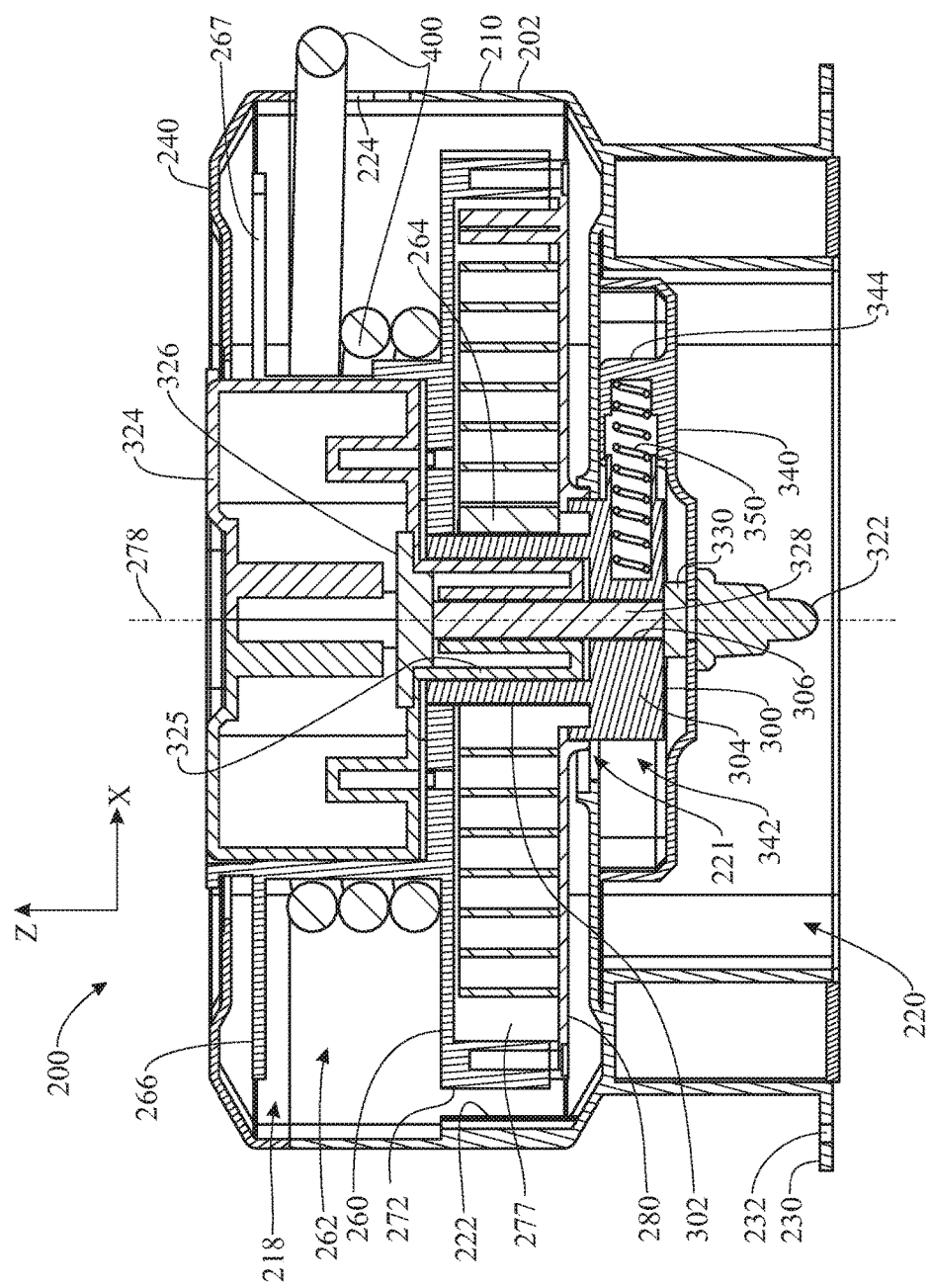
FIG. 16 presents a cross-sectional front elevation view of the cord retractor in the position of FIG. 14, the section taken along section plane 16-16, the cross-sectional front elevation view including the casing lid in a closed position and an appliance cord wound on the cord drum.

The cord retractor 200 further comprises an electrical socket assembly 320 housed within the casing 202, in electrical communication with a cable 322 extending out of the casing 202. The electrical socket assembly 320 comprises an electrical socket 324, best shown in FIGS. 1 and 2, arranged at a top side of the casing body 210 and facing the casing lid 240, for the plugging thereinto of an electrical plug of an electrically-powered appliance or tool (for instance, a hair dryer). The electrical socket assembly 320 further comprises a set of electrically-conductive pieces for providing electrical communication between the electrical socket 324 and the cable 322; in the present embodiment, said electrically-conductive pieces consist of a disc-shaped, first contact 326, an electrically-conductive rod 328 and a disc-shaped, second contact 330, all of which provide an electrical path for electrical current to flow from the cable 322 to the electrical socket 324, and thus to an appliance (not shown) plugged into the electrical socket 324. As best shown in FIG. 16, a neck 325 of the electrical socket 324 is fitted inside the through hole 306 of the support 300 in the area of the top section 302. In turn, the electrically-conductive rod 328 extends through the support 300, and is tightly fitted within the through hole 306 of the support 300 in the area of the bottom section 304, and within the neck 325 of the electrical socket 324.

As shown in FIGS. 12, 13 and 16, the cord retractor 200 further includes a bottom cover 340 non-movably attached to the base panel 212 of the casing body 210. The bottom cover 340 has an internal space 342 arranged facing upward. As best shown in FIG. 16, the bottom section 304 of the support 300 is received within the internal space 342 of the bottom cover 340. A compression spring 350 is arranged between the support 300 and a shoulder 344 of the bottom cover 340. Because the bottom cover 340 is fixed (non-movable), the compression spring, when compressed, pushes the support 300 away from the shoulder 344.

As mentioned heretofore, the through opening 221 of the base panel 212 of the casing body 210 is slightly elongated in the transverse direction Y. The support 300 is rotationally fixed within the through opening 221, yet loosely and movably received within the through opening 221 along the transverse direction Y; thus, the support 300 is translatable back-and-forth along the through opening 221 in said transverse direction Y. The electrical socket assembly 320 (electrical socket 324, first contact 326, electrically-conductive rod 328 and second contact 330), cord drum 260, cover 280 and coil spring 290 are carried by the support 300.

Two types of movements can take place inside the casing 202. On one hand, the assembly formed by the support 300 and remaining items which are carried by the support 300 (i.e., the electrical socket assembly 320, cord drum 260, cover 280 and coil spring 290) are jointly translatable back-and-forth in the transverse direction Y along the through opening 221. On another hand, the cord drum 260 and cover 280 are rotatable in unison relative to the support 300; rotation of the cord drum 260 and cover 280 takes place about rotation axis 278. Thus, the cord drum 260 and cover 280 are both translatable and rotatable.

Figure 11:
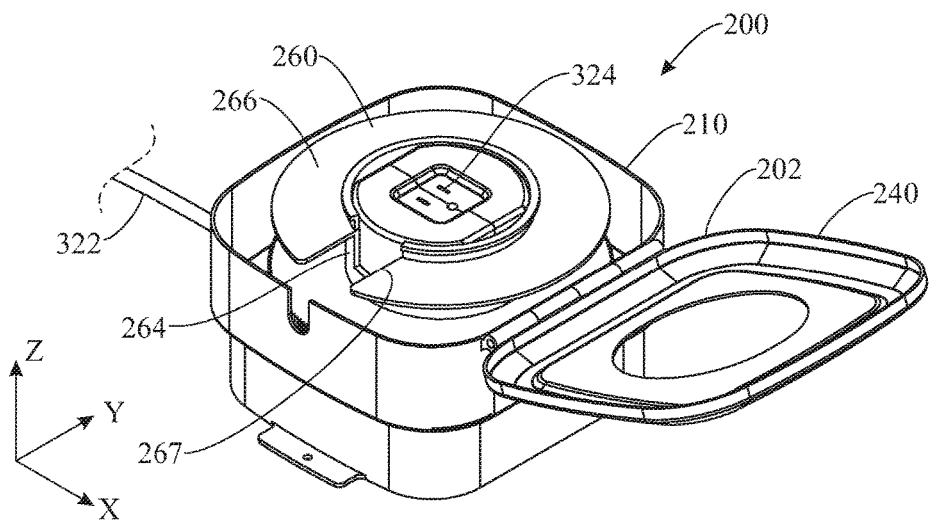
FIG. 11 presents a top rear perspective view of the cord retractor of FIG. 10, with the lid shown in an open position.

In an illustrative application of the cord retractor 200, a user may install the cord retractor 200 on a wall by removing the peel-off later 228 and adhering the casing 202 to the wall (not shown), and then proceed to connect the cable 322 to electrical power by methods known in the art. Once the cord retractor 200 is installed, it is readily available for use when needed. For instance, a user may wish to regularly utilize a hair dryer and not wish to have to repeatedly plug and unplug the hairdryer cord 400 to and from a conventional electrical wall socket. Such a user may benefit from the invention. For this purpose, the user may open the casing lid 240, as shown in FIG. 11, and proceed to plug the hair dryer into the electrical socket 324 of the cord retractor 200. The user may then arrange the hairdryer cord 400 over the slit 267 of the top plate 266 of the cord drum 260 and through the side opening 224 of the casing 202. The user may then close the casing lid 240. As shown in FIG. 16, when the casing lid 240 is in the closed position (also shown in FIG. 11), the side opening 224 of the casing 202 is in horizontal registration with the cord space 262 of the cord drum 260. Also, if the user exerts no force whatsoever on the cord 400, the compression spring 350 is biasing the support 300 away from the shoulder 344, and thus away from the side opening 224 of the casing body 210 and towards the locking protrusion 222. Thus, in an initial, rest position of the cord retractor 200 (similar to the position shown in FIG. 17), the assembly formed by the support 300 and remaining items which are carried by the support 300 (i.e., the electrical socket assembly 320, cord drum 260, cover 280 and coil spring 290) are arranged, by translating in the transverse direction Y along the through opening 221, to an initial, locked position (shown in FIG. 15) in which the teeth 272 of the cord drum 260 interlock with the locking protrusion 222 of the casing body 210, said interlocking preventing the cord drum 260 from rotating in relation to the casing body 210 about the rotation axis 278. Furthermore, in this initial, locked position, the coil spring 290 is loaded or tensioned, and is exerting a force on the topward protrusion 284 in a cord-winding direction (counterclockwise, in the arrangement shown in the drawings). This force, however, is incapable of turning the cover 280 and cord drum 260 due to the fact that the aforementioned teeth interlocking prevents the cord drum 260 from rotating.

Figure 14:
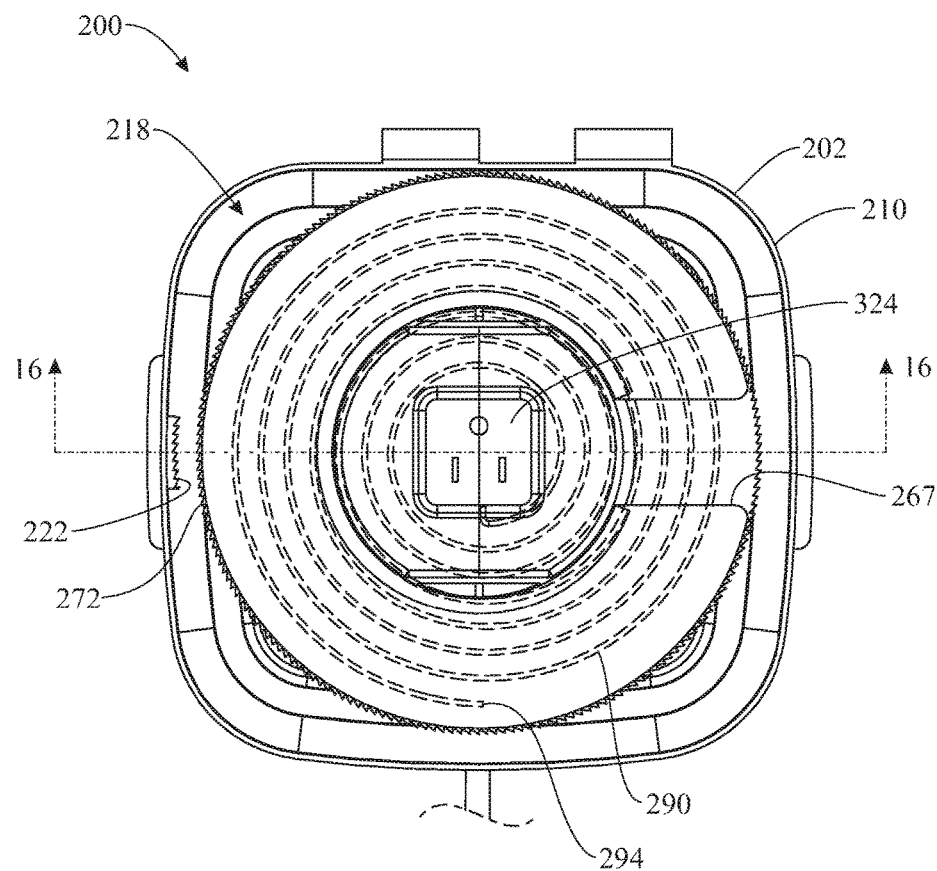
FIG. 14 presents a top plan view of the cord retractor of FIG. 10, with the cord drum shown in a transverse, unlocked position and with the casing lid omitted.
Figure 15:
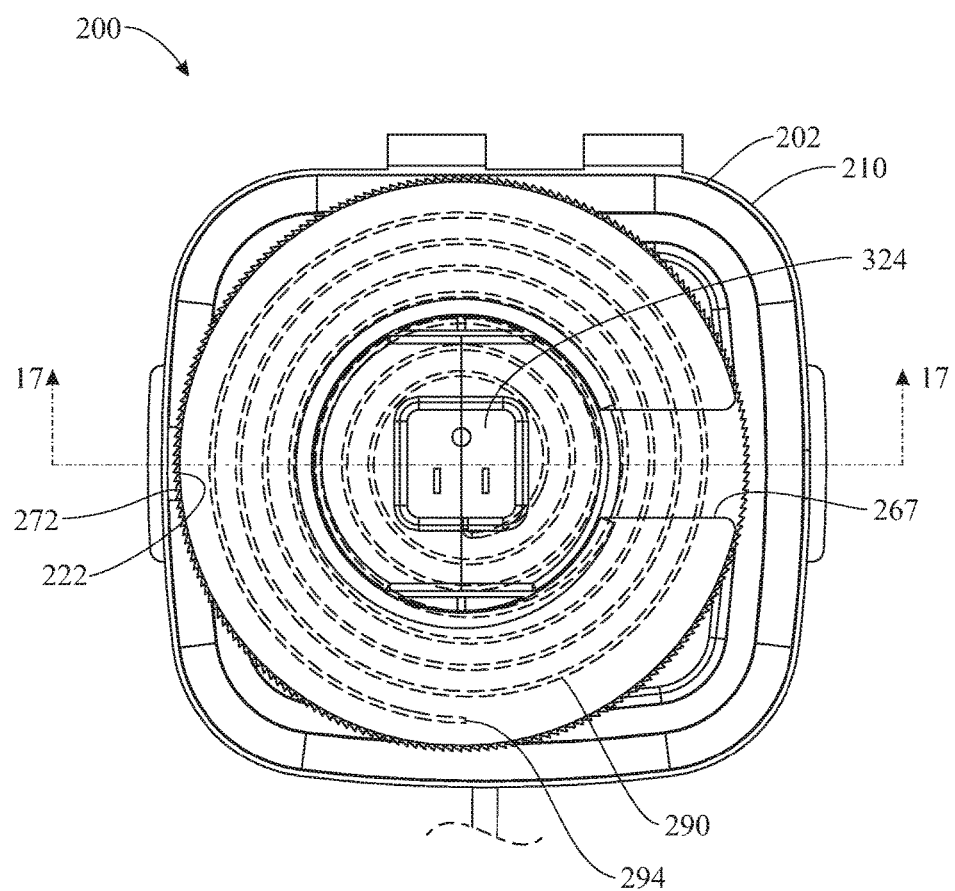
FIG. 15 presents a top plan view of the cord retractor of FIG. 10, with the cord drum shown in a transverse, locked position and with the casing lid omitted.
Figure 17:
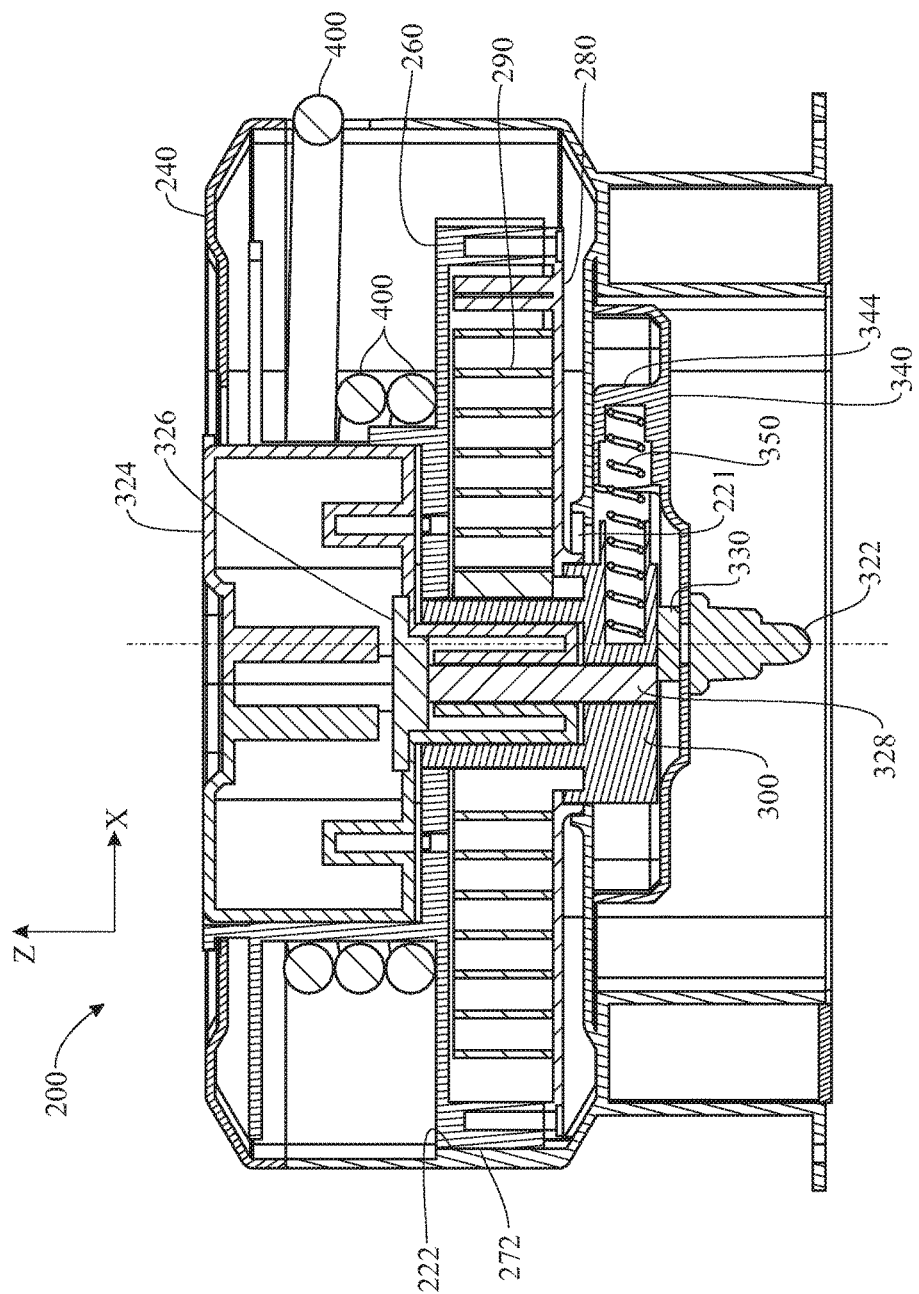
FIG. 17 presents a cross-sectional front elevation view of the cord retractor in the position of FIG. 15, the section taken along section plane 17-17, the cross-sectional front elevation view including the casing lid in a closed position and an appliance cord wound on the cord drum.

If the user then pulls on the hairdryer cord 400 outward as indicated by arrow B in FIG. 16, the pulling force causes the cord 400 to pull on the electrical socket 324 in the transverse direction Y. The transverse pulling on the electrical socket 324 causes the assembly formed by the support 300 and remaining items which are carried by the support 300 (i.e., the electrical socket assembly 320, cord drum 260, cover 280 and coil spring 290) to jointly move along the through opening 221 in the direction of arrow A. In consequence, the teeth 272 of the cord drum 260 disengage and move away from the teeth of the locking protrusion 222, as shown in FIG. 14. As soon as the teeth disengage from each other, the cord drum 260 becomes unlocked and free to rotate about the rotation axis 278. The tensioned coil spring 290 then forces the cord drum 260 and cover 280 to rotate in a cord-winding direction (clockwise). If the user then continues pulling on the cord 400 in the direction of arrow A, but soft enough to allow the cord drum 260 to rotate in the cord-winding direction, the cord 400 starts winding on the cord drum 260 and eventually becomes wound as shown in FIG. 16. When the user no longer wishes to further wind the cord 400, the user can cease the pulling force in the direction of arrow A, allowing the compression spring 350 to expand and push the assembly formed by the support 300 and remaining items which are carried by the support 300 (i.e., the electrical socket assembly 320, cord drum 260, cover 280 and coil spring 290) to jointly move along the through opening 221 towards the locking protrusion 222. The teeth 272 of the cord drum 260 eventually engage the teeth of the locking protrusion 222 and cause the cord drum 260 and cover 280 to become locked and prevented from rotating, as shown in FIG. 17. In the locked position of FIG. 17, the cord 400 is wound on the cord retractor 400 and plugged into the electrical socket 324. In order to use the hairdryer, the user may simply pull on the cord 400 in the direction of arrow A in order to unwind the cord 400 to the desired extension.

Furthermore, having an opening (lid opening 242) extending through the casing lid 240 allows the cord retractor 200 to serve as a regular wall socket, if needed.

In some embodiments, at least one light, such as an LED, for example and without limitation, may be provided on the casing 102, 202. The light can be selectively activated in a dark environment for safety purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A cord retractor for selectively retracting or extending an electrical cord, comprising:
   a casing having an internal space;
   a rotatable drum arranged within the internal space of the casing, wherein the drum is rotatable relative to the casing in a first direction and an opposite, second direction about a rotation axis; and
   a coil spring arranged within the internal space of the casing, wherein the coil spring engages the drum and biases the drum to rotate relative to the casing in said first direction and not in said second direction; wherein
   the drum is reversibly movable within the casing from a first position in which the drum engages a locking protrusion of the casing, thereby preventing the drum from rotating, to a second position in which the drum does not engage said locking protrusion, thereby allowing the drum to rotate; and further wherein
   the drum is reversibly movable within the casing from the first position to the second position along a transverse direction, wherein said transverse direction is perpendicular to said rotation axis.

2. The cord retractor of claim 1, wherein the casing further comprises an adhesive surface covered by a peel-off layer.

3. The cord retractor of claim 1, wherein the casing further comprises at least one outwardly protruding flange having at least one opening configured for the passing therethrough of a fastener.

4. The cord retractor of claim 1, wherein the locking protrusion is toothed, and further wherein the drum comprises an outer toothed section configured to interlock with the locking protrusion when the drum is in the second position.

5. The cord retractor of claim 1, wherein the casing further comprises an opening configured for the passing therethrough of a cord from outside the casing to the internal space.

6. The cord retractor of claim 5, further comprising a cord stopper movably arranged at the opening to selectively block or prevent sliding of a cord through the opening.

7. The cord retractor of claim 1, wherein the drum is subjected to a spring-biasing toward said first position.

8. The cord retractor of claim 7, wherein the casing further comprises an opening configured for the passing therethrough of a cord from the internal space to outside the casing and further configured such that pulling of a cord outward through the opening counteracts said spring-biasing and moves the drum towards said second position.

9. The cord retractor of claim 1, wherein the casing comprises a casing body and a casing lid, wherein the lid is movable between a closed position on the casing body and an open position moved away from the casing body providing access to the internal space.

10. The cord retractor of claim 9, wherein the casing lid is hinged to the casing body.

11. The cord retractor of claim 1, further comprising an electrical socket arranged at least partially within the casing, an electrically-conductive cable assembly extending outwardly from the casing and configured to conduct electrical power towards said casing, and a set of one or more electrically-conductive parts arranged inside the casing providing electrical communication between the cable assembly and the electrical socket.

12. The cord retractor of claim 11, wherein said electrical socket faces outwardly from a first side of said casing and further wherein the casing comprises an adhesive surface covered by a peel-off layer, said adhesive surface and peel-off layer arranged on a second side of said casing opposite to said first side.

13. The cord retractor of claim 11, wherein the casing comprises a casing body and a casing lid, the lid movable between a closed position on the casing body and an open position moved away from the casing body providing access to the internal space, and further wherein the casing lid comprises a through opening configured to face the electrical socket when the casing lid is in the closed position.

14. The cord retractor of claim 11, further comprising a hollow support arranged between the cable assembly and the electrical socket, wherein the set of one or more electrically-conductive parts extends through the support, and further wherein the drum is carried by the support and is rotatable relative to the support.

15. The cord retractor of claim 14, wherein the electrical socket, the support and the drum are movable within the casing in unison, from the first position in which the drum engages the locking protrusion of the casing, thereby preventing rotation of the drum relative to the support, and the second position in which the drum does not engage said locking protrusion, thereby allowing rotation of the drum relative to the support.

16. The cord retractor of claim 15, wherein the support is spring-biased toward said first position.

17. A cord retractor for selectively retracting or extending an electrical cord, comprising:
   a casing having an internal space;
   a rotatable drum arranged within the internal space of the casing, wherein the drum is rotatable relative to the casing in a first direction and an opposite, second direction;
   a coil spring arranged within the internal space of the casing, wherein the coil spring engages the drum and biases the drum to rotate relative to the casing in said first direction and not in said second direction;
   an electrical socket arranged at least partially within the casing, an electrically-conductive cable assembly extending outwardly from the casing and configured to conduct electrical power towards said casing, and a set of one or more electrically-conductive parts arranged inside the casing providing electrical communication between the cable assembly and the electrical socket; and
   a hollow support arranged between the cable assembly and the electrical socket, wherein the set of one or more electrically-conductive parts extends through the support, and further wherein the drum is carried by the support and is rotatable relative to the support.

18. The cord retractor of claim 17, wherein the electrical socket, the support and the drum are movable within the casing in unison, from a first position in which the drum engages a locking protrusion of the casing, thereby preventing rotation of the drum relative to the support, and a second position in which the drum does not engage said locking protrusion, thereby allowing rotation of the drum relative to the support.

19. The cord retractor of claim 18, wherein the support is spring-biased toward said first position.

\* \* \* \* \*